United States Patent
Zhang

(10) Patent No.: US 10,231,192 B2
(45) Date of Patent: Mar. 12, 2019

(54) COORDINATED POWER ALLOCATION METHOD AND APPARATUS

(71) Applicant: Huawei Technologies Co., Ltd., Shenzhen, Guangdong (CN)

(72) Inventor: Lili Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 15/506,705

(22) PCT Filed: Aug. 27, 2014

(86) PCT No.: PCT/CN2014/085284
§ 371 (c)(1),
(2) Date: Feb. 24, 2017

(87) PCT Pub. No.: WO2016/029381
PCT Pub. Date: Mar. 3, 2016

(65) Prior Publication Data
US 2018/0227859 A1   Aug. 9, 2018

(51) Int. Cl.
*H04W 52/30* (2009.01)
*H04W 52/14* (2009.01)
*H04W 52/36* (2009.01)
*H04W 52/40* (2009.01)
*H04W 52/22* (2009.01)

(52) U.S. Cl.
CPC ......... *H04W 52/30* (2013.01); *H04W 52/146* (2013.01); *H04W 52/365* (2013.01); *H04W 52/40* (2013.01); *H04W 52/228* (2013.01)

(58) Field of Classification Search
USPC .............. 455/522, 69–70, 343.1–343.6
See application file for complete search history.

(56) References Cited

U.S. PATENT DOCUMENTS

| 2010/0273515 A1 | 10/2010 | Fabien et al. |
| 2013/0176953 A1* | 7/2013 | Stern-Berkowitz ......... H04W 52/146 370/329 |

(Continued)

FOREIGN PATENT DOCUMENTS

| CN | 101340622 A | 1/2009 |
| CN | 103733697 A | 4/2014 |

(Continued)

OTHER PUBLICATIONS

"3rd Generation Partnership Project;Technical Specification Group Radio Access Network;Evolved Universal Terrestrial Radio Access (E-UTRA);User Equipment (UE) radio transmission and reception (Release 12)"; 3GPP TS 36.101 V12.4.0; Jun. 2014; 532 pages.

(Continued)

*Primary Examiner* — Fayyaz Alam

(57) ABSTRACT

A method includes: determining communication information about communication between user equipment UE and each base station; determining, according to the communication information, remaining power usage information allocated to each base station; and reporting the determined remaining power usage information allocated to each base station to each corresponding base station.

7 Claims, 4 Drawing Sheets

(56) References Cited

U.S. PATENT DOCUMENTS

2014/0056278 A1 2/2014 Marinier et al.
2018/0146441 A1* 5/2018 Takaoka ............ H04W 28/0268

FOREIGN PATENT DOCUMENTS

EP          2437554 A1    4/2012
WO       2013025562 A2    2/2013

OTHER PUBLICATIONS

"3rd Generation Partnership Project;Technical Specification Group Radio Access Network;Evolved Universal Terrestrial Radio Access (E-UTRA);Physical layer procedures(Release 12)"; 3GPP TS 36.213 V12.2.0; Jun. 2014; 207 pages.

"3rd Generation Partnership Project;Technical Specification Group Radio Access Network;Evolved Universal Terrestrial Radio Access (E-UTRA);Physical layer procedures(Release 13)"; 3GPP TS 36.213 V13.0.0; Dec. 2015; 326 pages.

"3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 12)"; 3GPP TS 36.300 V12.2.0; Jun. 2014; 215 pages.

"3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 13)"; 3GPP TS 36.300 V13.0.0; Jun. 2015; 254 pages.

"3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 13)"; 3GPP TS 36.300 V13.2.0; Dec. 2015; 290 pages.

"3rd Generation Partnership Project;Technical Specification Group Radio Access Network; Evolved Universal Terrestrial Radio Access (E-UTRA);Medium Access Control (MAC) protocol specification (Release 12)"; 3GPP TS 36.321 V12.2.1, Jun. 2014; 57 pages.

3rd Generation Partnership Project;Technical Specification Group Radio Access Network;Evolved Universal Terrestrial Radio Access (E-UTRA);Medium Access Control (MAC) protocol specification;(Release 13); 3GPP TS 36.321 V13.0.0; Dec. 2015; 82 pages.

Huawei et al.; "Power allocation in asynchronous dual connectivity"; 3GPP TSG RAN WG1 Meeting #78bis; R1-143708; Ljubljana, Slovenia; Oct. 6-10, 2014; 4 pages.

* cited by examiner

COORDINATED POWER ALLOCATION METHOD AND APPARATUS

CROSS-REFERENCE TO RELATED APPLICATIONS

The present application claims priority under 35 U.S.C. § 365 to International Patent Application No. PCT/CN2014/085284 filed Aug. 27, 2014, which is incorporated herein by reference into the present disclosure as if fully set forth herein.

TECHNICAL FIELD

The present invention relates to the field of communications technologies, and in particular, to a coordinated power allocation method and apparatus.

BACKGROUND

In a wireless communications system, UE needs to report total power headroom (power headroom, PH) of the UE to each base station by means of a PHR (Power Headroom Report, power headroom report), so as to assist each base station in efficiently scheduling uplink transmission of different UE. Therefore, each base station may determine, according to the total power headroom, an uplink bandwidth that can be used by each UE on each subframe.

In some application scenarios, UE can establish connections to multiple base stations at the same time. A multi-link system is used as an example. Multi-link is an important topic of study in a case of a heterogeneous network (heterogeneous network, HetNet) in which small cells are densely located. The multi-link mainly means that UE (User Equipment, user equipment) can connect to a macro cell base station and a small cell base station at the same time. In a multi-link scenario, a macro base station and a small cell base station are independent, that is, each does not know scheduling information of the other. In the prior art, the UE reports only one true current PHR value to each base station, and each base station may schedule the UE at the same time according to the PHR value, thereby causing a waste of scheduling resources. Moreover, scheduling according to one shared PHR report is inaccurate.

SUMMARY

Embodiments of the present invention provide a coordinated power allocation method and apparatus to resolve a scheduling resource waste problem.

According to a first aspect, an embodiment of the present invention provides a coordinated power allocation method, including:

determining communication information about communication between user equipment UE and each base station;

determining, according to the communication information, remaining power usage information allocated to each base station; and reporting the determined remaining power usage information allocated to each base station to each corresponding base station.

With reference to the first aspect, in a first possible implementation manner of the first aspect, the determining remaining power usage information allocated to each base station includes:

determining a remaining power usage amount allocated to each base station, or determining a remaining power usage proportion allocated to each base station; and when the determined remaining power usage information allocated to each base station is the remaining power usage proportion allocated to each base station, after the determining remaining power usage information allocated to each base station, the method further includes:

reporting total power headroom of the UE to each corresponding base station.

With reference to the first possible implementation manner of the first aspect, in a second possible implementation manner of the first aspect, when the remaining power usage information that is allocated to each base station and determined according to the communication information is the remaining power usage amount allocated to each base station, before the determined remaining power usage amount allocated to each base station is reported to each corresponding base station, the method further includes:

when it is determined that a sum of the remaining power usage amounts allocated to all the base stations is greater than the total power headroom of the UE, determining, according to importance of data transmitted by the UE to each base station or communication quality of the communication between the UE and each base station, a scaling factor for scaling down the remaining power usage amount allocated to each base station; and the reporting the determined remaining power usage amount allocated to each base station to each corresponding base station includes:

scaling down, by using the determined scaling factor for scaling down the remaining power usage amount allocated to each base station, the remaining power usage amount allocated to each base station, so as to re-obtain a remaining power usage amount allocated to each base station and report to each base station to each corresponding base station; or reporting the determined remaining power usage amount allocated to each base station and the scaling factor to each corresponding base station.

With reference to the first possible implementation manner of the first aspect, in a third possible implementation manner of the first aspect, the determining, according to the communication information, a remaining power usage amount allocated to each base station includes:

determining, according to the communication information, the remaining power usage proportion allocated to each base station; and determining, according to the remaining power usage proportion and the total power headroom of the UE, the remaining power usage amount allocated to each base station.

With reference to any one of the first aspect or the first to the third possible implementation manners of the first aspect, in a fourth possible implementation manner of the first aspect, the determined communication information about the communication between the user equipment UE and each base station includes at least one of the following:

an amount of to-be-transmitted data in the communication between the UE and each base station;

historical scheduling information of the communication between the UE and each base station; or a path loss power of the communication between the UE and each base station.

According to a second aspect, an embodiment of the present invention provides a coordinated power allocation method, including:

receiving total power headroom of user equipment UE and communication information that is sent by the UE and about communication between the UE and each base station; and determining, according to the communication information and the total power headroom of the UE, a first remaining power used for communication with the UE.

With reference to the second aspect, in a first possible implementation manner of the second aspect, the determining, according to the communication information and the total power headroom of the UE, a first remaining power used for communication with the UE specifically includes:

determining, according to the communication information, a first pre-allocated remaining power used for the communication with the UE;

obtaining a second pre-allocated remaining power used for communication between the UE and another base station communicating with the UE;

when it is determined that a sum of the second pre-allocated remaining power and the first pre-allocated remaining power is greater than the total power headroom of the UE, negotiating with the another base station to re-determine a first pre-allocated remaining power and a second pre-allocated remaining power, until a sum of the re-determined first pre-allocated remaining power and the re-determined second pre-allocated remaining power is not greater than the total power headroom of the UE; and determining the re-determined first pre-allocated remaining power as the first remaining power used for the communication with the UE.

With reference to the first possible implementation manner of the second aspect, in a second possible implementation manner of the second aspect, the negotiating with the another base station to re-determine a first pre-allocated remaining power and a second pre-allocated remaining power specifically includes:

negotiating with the another base station to re-determine a closed-loop power control adjustment value and/or transport format compensation value;

sending a determined closed-loop power control adjustment value and/or transport format compensation value to the UE; and receiving a first pre-allocated remaining power and a second pre-allocated remaining power that are recalculated by the UE according to the determined closed-loop power control adjustment value and/or transport format compensation value and a re-determined closed-loop power control adjustment value and/or transport format compensation value sent by the another base station.

With reference to the second aspect, in a third possible implementation manner of the second aspect, the determining, according to the communication information and the total power headroom of the UE, a first remaining power used for communication with the UE specifically includes:

determining, according to the communication information, a first pre-allocated remaining power used for the communication with the UE;

obtaining a second pre-allocated remaining power used for communication between the UE and another base station communicating with the UE;

if it is determined that a sum of the second pre-allocated remaining power and the first pre-allocated remaining power is greater than the total power headroom of the UE, re-determining, according to a priority of the communication between each base station and the UE, a first pre-allocated remaining power and a second pre-allocated remaining power that are used for the communication with the UE; and determining the re-determined first pre-allocated remaining power as the first remaining power used for the communication with the UE.

According to a third aspect, an embodiment of the present invention provides a coordinated power allocation method, including: receiving a first remaining power reported by user equipment UE;

obtaining a second remaining power that is reported by the UE and received by another base station communicating with the UE; and if it is determined that a sum of the second remaining power and the first remaining power is greater than total power headroom of the UE, negotiating with the another base station to re-determine a first remaining power and a second remaining power, until a sum of the re-determined first remaining power and the re-determined second remaining power is not greater than the total power headroom of the UE.

With reference to the third aspect, in a first possible implementation manner of the third aspect, the negotiating with the another base station to re-determine a first remaining power and a second remaining power specifically includes:

negotiating with the another base station to re-determine a closed-loop power control adjustment value and/or transport format compensation value;

sending a determined closed-loop power control adjustment value and/or transport format compensation value to the UE; and receiving a first remaining power and a second remaining power that are recalculated by the UE according to the determined closed-loop power control adjustment value and/or transport format compensation value and a re-determined closed-loop power control adjustment value and/or transport format compensation value sent by the another base station.

With reference to the third aspect, in a second possible implementation manner of the third aspect, the negotiating with the another base station to re-determine a first remaining power and a second remaining power specifically includes:

re-determining, according to a priority of communication between each base station and the UE, a first remaining power and a second remaining power that are used for the communication with the UE.

According to a fourth aspect, an embodiment of the present invention provides a coordinated power allocation method, and the method includes:

when it is determined that a sum of uplink powers allocated to all base stations is greater than a maximum transmit power of the UE, determining, according to importance of data transmitted by the UE to each base station or communication quality of communication between the UE and each base station, a scaling factor for scaling down an uplink power allocated to each base station; and scaling down, by using the determined scaling factor for scaling down the uplink power allocated to each base station, the uplink power allocated to each base station, so as to re-obtain an uplink power allocated to each base station and report to each base station to each corresponding base station; or reporting the remaining power usage amount allocated to each base station and the scaling factor to each corresponding base station.

According to a fifth aspect, an embodiment of the present invention provides a coordinated power allocation apparatus, including:

a determining unit, configured to determine communication information about communication between user equipment UE and each base station, and determine, according to the communication information, remaining power usage information allocated to each base station; and a sending unit, configured to report the remaining power usage information that is allocated to each base station and determined by the determining unit to each corresponding base station.

With reference to the fifth aspect, in a first possible implementation manner of the fifth aspect, the determining unit is specifically configured to determine a remaining power usage amount allocated to each base station, or determine a remaining power usage proportion allocated to each base station; and the sending unit is further configured to report total power headroom of the UE to each corresponding base station when the remaining power usage information that is allocated to each base station and determined by the determining unit is the remaining power usage proportion allocated to each base station.

With reference to the first possible implementation manner of the fifth aspect, in a second possible implementation manner of the fifth aspect, further includes a processing unit, where the determining unit is further configured to: when the remaining power usage information that is allocated to each base station and determined according to the communication information is the remaining power usage amount allocated to each base station, and when it is determined that a sum of the remaining power usage amounts allocated to all the base stations is greater than the total power headroom of the UE, before the determined remaining power usage amount allocated to each base station is reported to each corresponding base station, determine, according to importance of data transmitted by the UE to each base station or communication quality of the communication between the UE and each base station, a scaling factor for scaling down the remaining power usage amount allocated to each base station;

the processing unit is specifically configured to scale down, by using the scaling factor that is determined by the determining unit and for scaling down the remaining power usage amount allocated to each base station, the remaining power usage amount allocated to each base station, so as to re-obtain a remaining power usage amount allocated to each base station; and the sending unit is specifically configured to: report the re-obtained remaining power usage amount allocated to each base station to each corresponding base station; or report the scaling factor and the remaining power usage amount that is allocated to each base station and determined by the determining unit to each corresponding base station.

With reference to the first possible implementation manner of the fifth aspect, in a third possible implementation manner of the fifth aspect, the determining unit is specifically configured to:

determine, according to the communication information, the remaining power usage proportion allocated to each base station; and determine, according to the remaining power usage proportion and the total power headroom of the UE, the remaining power usage amount allocated to each base station.

With reference to any one of the fifth aspect or the first to the third possible implementation manners of the fifth aspect, in a third possible implementation manner of the fifth aspect, the communication information that is determined by the determining unit and about the communication between the user equipment UE and each base station includes at least one of the following:

an amount of to-be-transmitted data in the communication between the UE and each base station;

historical scheduling information of the communication between the UE and each base station; or a path loss power of the communication between the UE and each base station.

According to a sixth aspect, an embodiment of the present invention provides a coordinated power allocation apparatus, including:

a receiving unit, configured to receive total power headroom of user equipment UE and communication information that is sent by UE and about communication between the UE and each base station; and a determining unit, configured to determine, according to the communication information and the total power headroom of the UE, a first remaining power used for communication with the UE.

With reference to the sixth aspect, in a first possible implementation manner of the sixth aspect, the apparatus further includes an obtaining unit, where the determining unit is specifically configured to determine, according to the communication information, a first pre-allocated remaining power used for the communication with the UE;

the obtaining unit is configured to obtain a second pre-allocated remaining power used for communication between the UE and another base station communicating with the UE; and the determining unit is further configured to: when it is determined that a sum of the second pre-allocated remaining power and the first pre-allocated remaining power is greater than the total power headroom of the UE, negotiate with the another base station to re-determine a first pre-allocated remaining power and a second pre-allocated remaining power, until a sum of the re-determined first pre-allocated remaining power and the re-determined second pre-allocated remaining power is not greater than the total power headroom of the UE, and determine the re-determined first pre-allocated remaining power as the first remaining power used for the communication with the UE.

With reference to the first possible implementation manner of the sixth aspect, in a second possible implementation manner of the sixth aspect, further includes a sending unit, where the determining unit is specifically configured to negotiate with the another base station to re-determine a closed-loop power control adjustment value and/or transport format compensation value;

the sending unit is configured to send a determined closed-loop power control adjustment value and/or transport format compensation value to the UE; and the receiving unit is further configured to receive a first pre-allocated remaining power and a second pre-allocated remaining power that are recalculated by the UE according to the determined closed-loop power control adjustment value and/or transport format compensation value and a re-determined closed-loop power control adjustment value and/or transport format compensation value sent by the another base station.

With reference to the first possible implementation manner of the sixth aspect, in a third possible implementation manner of the sixth aspect, further includes an obtaining unit, where the determining unit is specifically configured to determine, according to the communication information, a first pre-allocated remaining power used for the communication with the UE;

the obtaining unit is configured to obtain a second pre-allocated remaining power used for communication between the UE and another base station communicating with the UE; and the determining unit is further configured to: when it is determined that a sum of the second pre-allocated remaining power and the first pre-allocated remaining power is greater than the total power headroom of the UE, re-determine, according to a priority of the communication between each base station and the UE, a first pre-allocated remaining power and a second pre-allocated remaining power that are used for the communication with the UE, and determine the re-determined first pre-allocated remaining power as the first remaining power used for the communication with the UE.

According to a seventh aspect, an embodiment of the present invention provides a coordinated power allocation apparatus, including:

a receiving unit, configured to receive a first remaining power reported by user equipment UE;

an obtaining unit, configured to obtain a second remaining power that is reported by the UE and received by another base station communicating with the UE; and a determining unit, configured to: when it is determined that a sum of the second remaining power and the first remaining power is greater than total power headroom of the UE, negotiate with the another base station to re-determine a first remaining power and a second remaining power, until a sum of the re-determined first remaining power and the re-determined second remaining power is not greater than the total power headroom of the UE.

With reference to the seventh aspect, in a first possible implementation manner of the seventh aspect, further includes a sending unit, where the determining unit is specifically configured to negotiate with the another base station to re-determine a closed-loop power control adjustment value and/or transport format compensation value;

the sending unit is configured to send a determined closed-loop power control adjustment value and/or transport format compensation value to the UE; and the receiving unit is specifically configured to receive a first remaining power and a second remaining power that are recalculated by the UE according to the determined closed-loop power control adjustment value and/or transport format compensation value and a re-determined closed-loop power control adjustment value and/or transport format compensation value sent by the another base station.

With reference to the seventh aspect, in a second possible implementation manner of the seventh aspect, the determining unit is specifically configured to re-determine, according to a priority of the communication between each base station and the UE, a first remaining power and a second remaining power that are used for the communication with the UE.

According to an eighth aspect, an embodiment of the present invention provides a coordinated power allocation apparatus, including:

a processing unit, configured to: when it is determined that a sum of uplink powers allocated to all base stations is greater than a maximum transmit power of the UE, determine, according to importance of data transmitted by the UE to each base station or communication quality of communication between the UE and each base station, a scaling factor for scaling down an uplink power allocated to each base station, and scale down, by using the determined scaling factor for scaling down the uplink power allocated to each base station, the uplink power allocated to each base station, so as to re-obtain an uplink power allocated to each base station; and a sending unit, configured to report the re-obtained uplink power allocated to each base station to each corresponding base station, or report the uplink power allocated to each base station and the scaling factor to each corresponding base station.

By using the technical solutions provided in the embodiments of the present invention, at a UE side, a power of UE is actively allocated to each base station according to communication information about communication between the UE and each base station, that is, the UE actively determines, according to some information, a remaining power that should be allocated to each base station, and reports remaining power usage information to each corresponding base station. Therefore, a problem of uplink power coordination of the UE between base stations is resolved at the UE side, and an allocated power is more accurate, which avoids a waste of resources.

In addition, a base station determines, according to total power headroom of UE and communication information that is reported by the UE and about communication between each base station and the UE, a remaining power used for communication between the base station and the UE, so that an allocated power is more accurate, and a waste of resources is avoided.

DETAILED DESCRIPTION

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The embodiments of the present invention provide a coordinated power allocation method and apparatus. UE sends remaining power usage information that is allocated to each base station and estimated by the UE to each base station, so that a problem of coordinating total power headroom of the UE between base stations is resolved at a UE side, allocated power headroom is more accurate, and a waste of resources is avoided. In addition, communication information used to estimate, by each base station, a remaining power usage amount for communication between each base station and the UE is delivered to each base station. Therefore, each base station estimates, according to the communication information, the remaining power usage amount for the communication between each base station and the UE, and determines a remaining power used for the communication between each base station and the UE (which is also a power that is in the total power headroom of the UE and should be used for the communication between each base station and the UE), so that an allocated power is more accurate, and a waste of resources is avoided.

Figure 1:
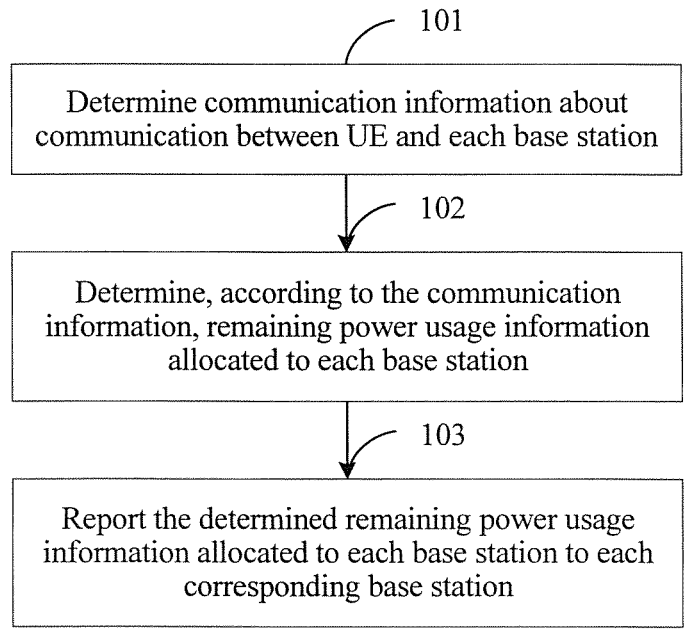
FIG. 1 is a flowchart of a first coordinated power allocation method according to an embodiment of the present invention.

An embodiment of the present invention provides a coordinated power allocation method. As shown in FIG. 1, the method may be executed by user equipment, and the user equipment performs communication connection to at least one base station. The method includes the following steps.

Step 101: Determine communication information about communication between the UE and each base station.

Step 102: Determine, according to the communication information, remaining power usage information allocated to each base station.

A remaining power is a power that is allocated to a base station and used for communication with the UE.

In this embodiment of the present invention, the communication information may include at least one of the following:

an amount of to-be-transmitted data in the communication between the UE and each base station, where the amount of to-be-transmitted data may be an amount of data in a buffer that is of the UE for each base station and used for uplink data transmission;

historical scheduling information of the communication between the UE and each base station, where the historical scheduling information may be scheduling information about scheduling of the UE by each base station in a period of time before a current moment; or a path loss power of the communication between the UE and each base station.

All the foregoing three types of communication information can reflect an uplink power status of the UE to some extent. The UE may determine, according to one or a combination of two or more of the foregoing three types of communication information, a remaining power usage amount that should be allocated to a base station.

Step 103: Report the determined remaining power usage information allocated to each base station to each corresponding base station.

How the UE notifies the base station of remaining power usage information allocated to the base station is not limited in this embodiment of the present invention. The UE may notify, by using various existing manners or approaches for communication with a base station, the base station of the remaining power usage information allocated to the base station.

In this embodiment of the present invention, at a UE side, a power of UE is actively allocated to each base station according to communication information about communication between the UE and each base station, that is, the UE actively determines, according to some communication information, a remaining power that is in total power headroom of the UE and that should be allocated to each base station, and reports usage information about the allocated remaining power to each corresponding base station. Therefore, a problem of uplink power coordination of the UE between base stations is resolved at the UE side, and an allocated power is more accurate, which avoids a waste of resources.

Figure 2:
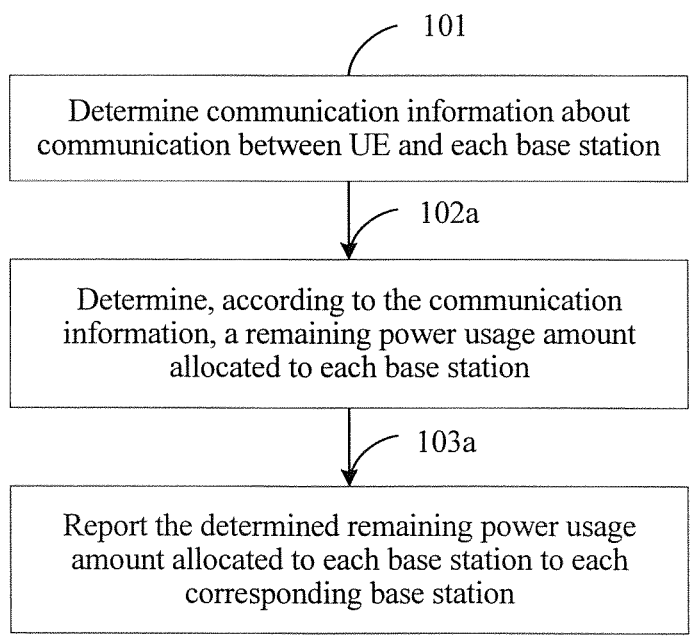
FIG. 2 is a flowchart of a second coordinated power allocation method according to an embodiment of the present invention.

In an embodiment, as shown in FIG. 2, step 102 of the determining, according to the communication information, remaining power usage information allocated to each base station may be 102a: determining, according to the communication information, a remaining power usage amount allocated to each base station.

Figure 3:
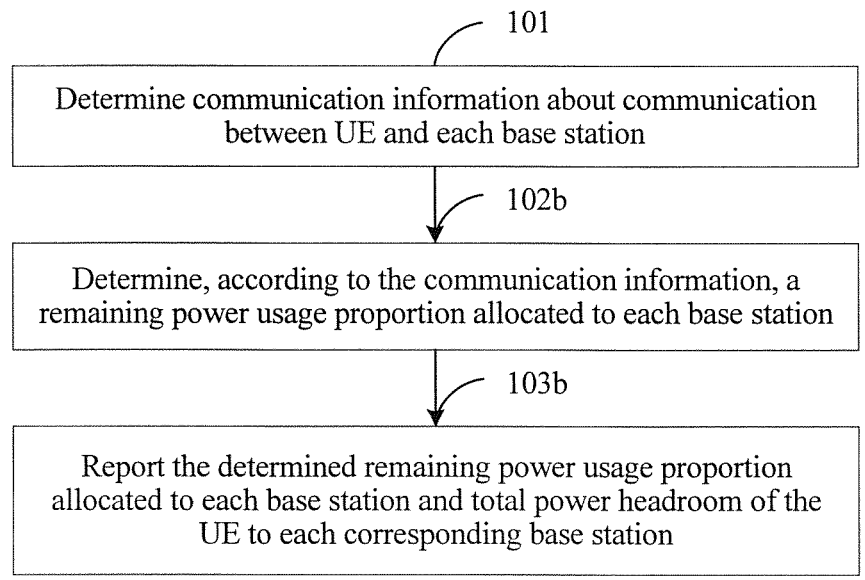
FIG. 3 is a flowchart of a third coordinated power allocation method according to an embodiment of the present invention.

In an embodiment, as shown in FIG. 3, step 102 of the determining, according to the communication information, remaining power usage information allocated to each base station may be 102b: determining, according to the communication information, the remaining power usage proportion allocated to each base station. Therefore, step 103 of the reporting the determined remaining power usage information allocated to each base station to each corresponding base station is 103a: reporting the determined remaining power usage amount allocated to each base station to each corresponding base station.

After step 102b, after the remaining power usage proportion allocated to each base station is determined, total power headroom of the UE is reported to each corresponding base station. That is, the total power headroom of the UE and the remaining power usage proportion allocated to each base station may be reported together to each corresponding base station, or may be separately reported, and a sequence is not limited in this embodiment of the present invention. Therefore, step 103 of the reporting the determined remaining power usage information allocated to each base station to each corresponding base station is 103b: reporting the determined remaining power usage proportion allocated to each base station and total power headroom of the UE to each corresponding base station.

Specifically, in step 102a, the determining, according to the communication information, a remaining power usage amount allocated to each base station may specifically include:

determining, according to the communication information, the remaining power usage proportion allocated to each base station; and determining, according to the remaining power usage proportion and the total power headroom of the UE, the remaining power usage amount allocated to each base station.

Specifically, before step 103a, may further include:

when it is determined that a sum of the remaining power usage amounts allocated to all the base stations is greater than the total power headroom of the UE, determining, according to importance of data transmitted by the UE to each base station or communication quality of the communication between the UE and each base station, a scaling factor for scaling down the remaining power usage amount allocated to each base station.

The total power headroom of the UE is a difference between a maximum transmit power of the UE and an actual transmit power of the UE.

Step 103a of the reporting the determined remaining power usage amount allocated to each base station to each corresponding base station includes:

scaling down, by using the determined scaling factor for scaling down the remaining power usage amount allocated to each base station, the remaining power usage amount allocated to each base station, so as to re-obtain a remaining power usage amount allocated to each base station and report to each base station to each corresponding base station; or reporting the determined remaining power usage amount allocated to each base station and the scaling factor to each corresponding base station.

Specifically, the determined remaining power usage amount allocated to each base station and the scaling factor are reported to each corresponding base station by means of a PHR.

Figure 4:
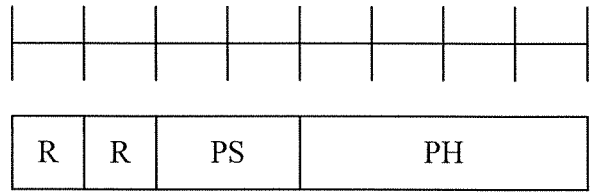
FIG. 4 is a schematic diagram of a PHR according to an embodiment of the present invention.

In this embodiment of the present invention, a new PHR format is designed and used to include a power scaling (PS, Power Scaling) factor. For example, as shown in FIG. 4, in an existing PHR format, 6 bit are used to represent a PHR, and 1 or 2 bits may be divided to represent a specified scaling factor. As shown in Table 1, a bit representation method and corresponding scaling factors may be predefined as a table.

For example, a macro base station is mainly used to control layer data, and important RRC signaling is primarily considered. Therefore, a relatively small scaling factor may be set to ensure reliable data transmission. In addition, for a link in a relatively poor channel condition (a link for communication between the UE and a small cell base station), the scaling factor may be reduced.

Although the scaling factor occupies an extra PHR report bit, considering a reduced data amount and improved data reliability in a double-link system in which data is split and different data is transmitted on different links, required PHR representation bits may be correspondingly reduced.

TABLE 1

PS level of a PHR

| PS | Power Scaling Level |
|---|---|
| 0 | Power_Scaling_0 |
| 1 | Power_Scaling_1 |
| 2 | Power_Scaling_2 |
| 3 | Power_Scaling_3 |

Specifically, when the communication information includes the historical scheduling information of the communication between the UE and each base station, step 103a of the determining, according to the communication information, a remaining power usage amount allocated to each base station may include:

obtaining, according to the historical scheduling information, a historical remaining power generated when the UE is scheduled by each base station; and determining, according to the historical remaining power, the remaining power usage amount allocated to each base station.

To ensure uplink transmission between the UE and a base station (an eNB is used as an example), the UE may determine, according to historical scheduling of the UE by the eNB, a remaining power usage amount allocated to the eNB by the UE. A quantity of RBs for uplink transmission that are scheduled by the eNB for the UE in history, a MCS (Modulation and Coding Scheme, modulation and coding scheme) and/or a higher layer configuration parameter related to an uplink transmit power setting are known to the UE. The UE may calculate, according to one or more types of the information, a remaining power usage amount consumed, or in other words, used by the UE under scheduling of the eNB each time, and then determine the remaining power usage amount that should be allocated to the eNB. Certainly, if a historical remaining power usage amount that is output by the UE under the scheduling of the eNB is directly recorded at a UE side, the UE may make a decision according to the record and does not need to make a calculation.

For example, in some scenarios, the UE may determine, according to an average of the historical powers, an uplink power allocated to the base station. For example, during a period of time T, an eNB schedules the UE three times in total, and PUSCH sending powers of the UE are P1, P2, and P3 respectively. Therefore, the UE may determine that the remaining power usage amount allocated to the eNB is P=(P1+P2+P3)/3.

P1, P2, and P3 may be obtained by using the following formula (1), that is, a PUSCH power calculation formula.

$$P_{PUSCH,c}(i) = \min \begin{Bmatrix} P_{CMAX,c}(i), \\ 10\log_{10}(M_{PUSCH,c}(i)) + \\ P_{O\_PUSCH,c}(j) + \alpha_c(j) \cdot \\ PL_c + \Delta_{TF,c}(i) + f_c(i) \end{Bmatrix} \quad (1)$$

In formula (1), $P_{CMAX,c}(i)$ is a maximum transmit power configured on the UE when a PUSCH channel is transmitted on a subframe i in a cell c; $M_{PUSCH,c}(i)$ is a quantity of RBs on the subframe i that are allocated to the PUSCH; $P_{O\_PUSCH,c}(j)$ is an open-loop power control adjustment value, where j is related to a scheduling grant manner of the PUSCH, j=0 when PUSCH transmission is granted by means of semi-persistent scheduling, j=1 when PUSCH transmission is granted by means of dynamic scheduling, and j=2 when PUSCH transmission is granted by means of random access response; $\alpha_c(j)$ is a partial path loss compensation value, and is determined by both a higher layer configuration parameter and the variable j, where when j=0 or 1, the partial path loss compensation value is determined by a higher layer configuration parameter in the cell c, or when j=2, $\alpha_c(j)=1$; $PL_c$ is path loss of the serving cell c that is measured by the UE; $\Delta_{TF,c}(i)$ is a transport format compensation value; and $f_c(i)$ is a closed-loop power control adjustment value, and is determined by a power control command sent by the base station.

If the sum of the remaining power usage amounts allocated to all the base stations is greater than the total power headroom of the UE, the scaling factor for scaling down the remaining power usage amount allocated to each base station is determined according to the determined importance of data transmitted by the UE to each base station or the communication quality of the communication between the UE and each base station. The remaining power usage amount allocated to each base station is determined according to the scaling factor.

For example, in a double-link, a remaining power usage amount allocated by the UE to a macro base station is PH1, and a remaining power usage amount allocated by the UE to a small cell base station is PH2. When PH1+PH2>PH (the total power headroom of the UE), a scaling factor for scaling down remaining power usage amounts allocated to the macro base station and the small cell base station is determined according to the determined importance of data transmitted by the UE to each base station or the determined communication quality of the communication between the UE and each base station (for example, greater importance of data communicatively transmitted to the macro base station is determined, and a determining manner may be pre-determining or the like). For example, a scaling factor for the macro base station is $\alpha 1$, and a scaling factor for the small cell base station is $\alpha 2$. When $PH1 \times \alpha 1 + PH2 \times \alpha 2 \leq PH$ is satisfied, the remaining power usage amount allocated to the macro base station is determined as $PH1 \times \alpha 1$, and the remaining power usage amount allocated to the small cell base station is determined as $PH2 \times \alpha 2$.

Specifically, when the communication information includes the amount of to-be-transmitted data in the communication between the UE and each base station (the amount of to-be-transmitted data may be an amount of data in a buffer that is of the UE for each base station and used for uplink data transmission), the determining, according to the communication information, the remaining power usage proportion of the remaining power allocated to each base station may include:

obtaining, according to the amount of data in the buffer, the remaining power usage proportion allocated to each base station, that is, a proportion of a remaining power usage amount allocated to each base station in the total power headroom of the UE.

The remaining power usage amount allocated to each base station may be further determined according to the proportion in the total power headroom of the UE.

A data buffer (buffer) of the UE is used to buffer to-be-sent uplink data. In an existing uplink CA technology, the UE has only one buffer, and data in the buffer is sent by using different base stations. In a multi-link technology, because of a non-ideal backhaul between eNBs, the UE may have a buffer for each base station, and data in each buffer may be sent only by using each corresponding base station. An amount of data in a buffer of the UE for a base station represents a quantity of data that needs to be sent to the base station by the UE. A relatively fully occupied buffer indicates that the UE needs to use a higher power to send data to the base station. Therefore, a power allocated to each base station by the UE may be directly proportional to an amount of data in a buffer corresponding to each base station.

In an exemplary manner, the power allocated by the UE is directly proportional to the amount of data in the buffer corresponding to each base station. In an example, there are two base stations, and PH1 and PH2 are an uplink power allocated to a base station 1 by the UE and an uplink power allocated to a base station 2 by the UE respectively. BSc1 and BSc2 are amounts of data in buffers corresponding to the two base stations respectively. If BSc1=BSc2=1000 bytes, PH1/PH2=BSc1/BSc2=1, that is, the power of the UE should be evenly divided between the two base stations. In this embodiment of the present invention, when the two base stations schedule the UE at the same time, PH1+PH2≤PH is satisfied, where PH is the total power headroom of the UE.

Specifically, when the communication information includes the path loss power of the communication between the UE and each base station, the determining, according to the communication information, the remaining power usage proportion allocated to each base station may include:

obtaining, according to the path loss power, the remaining power usage proportion allocated to each base station, that is, a proportion of a remaining power usage amount allocated to each base station in the total power headroom of the UE.

The remaining power usage amount allocated to each base station may be further determined according to the proportion in the total power headroom of the UE.

In an exemplary manner, the power allocated by the UE is directly proportional to the path loss power of each base station. In an example, there are two base stations, and PH1 and PH2 are a remaining power usage amount allocated to a base station 1 by the UE and a remaining power usage amount allocated to a base station 2 by the UE respectively. BH1 and BH2 are path loss powers of communication between the UE and the two base stations respectively. If BH1=BH2=10 bytes, PH1/PH2=BH1/BH2=1, that is, the power of the UE should be evenly divided between the two base stations. In this embodiment of the present invention, when the two base stations schedule the UE at the same time, PH1+PH2≤PH is satisfied, where PH is the total power headroom of the UE.

Figure 5:
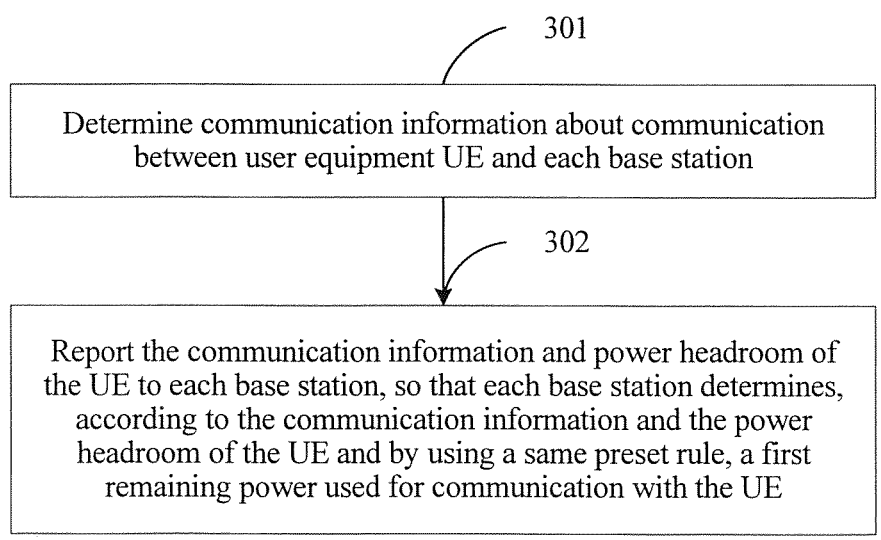
FIG. 5 is a flowchart of a fourth coordinated power allocation method according to an embodiment of the present invention.

An embodiment of the present invention further provides a coordinated power allocation method. As shown in FIG. 5, the method may be executed by a base station, and the method includes the following steps:

Step 301: Determine communication information about communication between user equipment UE and each base station.

Step 302: Report the communication information and a remaining power of the UE to each base station, so that each base station determines, according to the communication information and the remaining power of the UE, a first remaining power used for communication with the UE.

After receiving the communication information and the remaining power of the UE, each base station determines, according to a same preset rule, the first remaining power used for the communication with the UE.

A base station determines, according to total power headroom of UE and communication information that is reported by the UE and about communication between each base station and the UE, a remaining power used for communication between the base station and the UE, so that an allocated power is more accurate, and a waste of resources is avoided.

Figure 6:
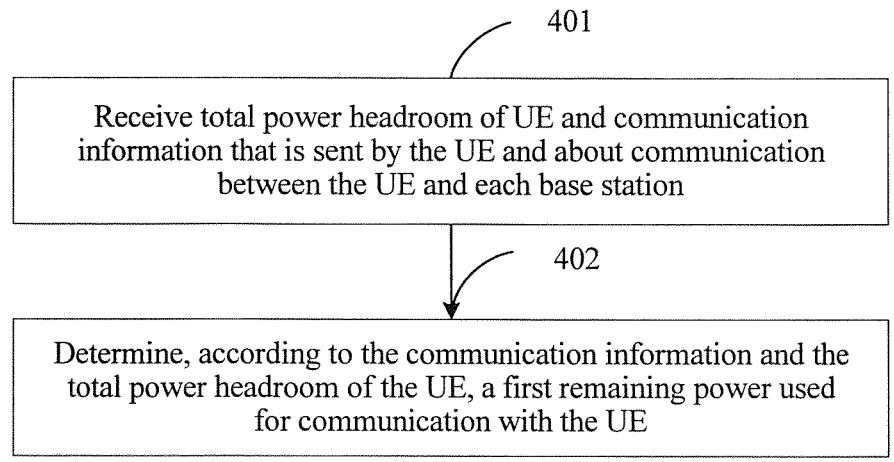
FIG. 6 is a flowchart of a fifth coordinated power allocation method according to an embodiment of the present invention.

An embodiment of the present invention further provides a coordinated power allocation method. As shown in FIG. 6, the method may be executed by a base station and includes the following steps:

Step 401: Receive total power headroom of UE and communication information that is sent by the UE and about communication between the UE and each base station.

Step 402: Determine, according to the communication information and the total power headroom of the UE, a first remaining power used for communication with the UE.

After receiving the communication information and the remaining power of the UE, each base station determines, according to a same preset rule, the first remaining power used for the communication with the UE.

The preset rule may be defined as a function in which the foregoing reported information is used as a parameter. If definition of the function is consistent and known by the base stations, the function is referred to as a preset rule. The total power headroom of the UE multiplying a value calculated by using the function is the power headroom used for the communication between the base station and the UE. For example, in a double-link system, the function may be represented as Func(A1, B1, C1)/Func(A2, B2, C2)), where A1, B1, and C1 are information factors sent by the foregoing UE to a base station1, and A2, B2, and C2 are information factors sent by the foregoing UE to a base station 2.

A base station determines, according to total power headroom of UE and communication information that is reported by the UE and about communication between each base station and the UE, a remaining power used for communication between the base station and the UE, so that an allocated power is more accurate, and a waste of resources is avoided.

In this embodiment of the present invention, the communication information may include at least one of the following:

an amount of to-be-transmitted data in the communication between the UE and each base station, where the amount of to-be-transmitted data may be an amount of data in a buffer that is of the UE for each base station and used for uplink data transmission;

historical scheduling information of the communication between the UE and each base station, where the historical scheduling information may be scheduling information about scheduling of the UE by each base station in a period of time before a current moment; or a path loss power of the communication between the UE and each base station.

In an embodiment, the determining, according to the communication information and the total power headroom of the UE, a first remaining power used for communication with the UE specifically includes:

determining, according to the communication information, a first pre-allocated remaining power used for the communication with the UE;

obtaining a second pre-allocated remaining power used for communication between the UE and another base station communicating with the UE;

if it is determined that a sum of the second pre-allocated remaining power and the first pre-allocated remaining power is greater than the total power headroom of the UE, re-determining, according to a priority of the communication between each base station and the UE, a first pre-allocated remaining power and a second pre-allocated remaining power that are used for the communication with the UE; and determining the re-determined first pre-allocated remaining power as the first remaining power used for the communication with the UE.

For example, in a double-link system, a macro base station determines, according to the communication information, a first pre-allocated remaining power used for communication with the UE, and obtains a second pre-allocated remaining power used for communication between the UE and a small cell base station communicating with the UE. If it is determined that a sum of the second pre-allocated remaining power and the first pre-allocated remaining power is greater than the total power headroom of the UE, the macro base station re-determines, according to preset priorities of the communication between the macro base station and the UE and between the small cell base station and the UE, a first pre-allocated remaining power used for the communication with the UE. For example, it is preset that the priority of the communication between the macro base station and the UE is higher than that of the communication between the small cell base station and the UE. The macro base station determines that the first remaining power used for the communication with the UE remains unchanged. A difference between the total power headroom of the UE and the first pre-allocated remaining power is determined as a second pre-allocated remaining power used for the communication between the small cell base station and the UE, and the re-determined first pre-allocated remaining power is determined as the first remaining power used for the communication with the UE.

In an embodiment of the present invention, the determining, according to the communication information and the total power headroom of the UE, a first remaining power used for communication with the UE, that is, step 402, specifically includes:

determining, according to the communication information, a first pre-allocated remaining power used for the communication with the UE;

obtaining a second pre-allocated remaining power used for communication between the UE and another base station communicating with the UE; and when it is determined that a sum of the second remaining power and the first remaining power is greater than the total power headroom of the UE, negotiating with the another base station to re-determine a first pre-allocated remaining power and a second pre-allocated remaining power, until a sum of the re-determined first pre-allocated remaining power and the re-determined second pre-allocated remaining power is not greater than the total power headroom of the UE; and determining the re-determined first pre-allocated remaining power as the first remaining power used for the communication with the UE.

Specifically, when the communication information includes the historical scheduling information of the communication between the UE and each base station, the determining, according to the communication information, a first pre-allocated remaining power used for the communication with the UE may include:

determining, by the base station according to the historical scheduling information, a historical remaining power usage amount generated when the UE is scheduled by the base station; and determining, according to the historical remaining power usage amount, the first pre-allocated remaining power used for the communication with the UE.

For example, in some scenarios, the bases station may determine, according to an average of historical remaining power usage amounts in the historical scheduling information, the first remaining power used for the communication with the UE. For example, during a period of time T, an eNB schedules the UE three times in total, and PUSCH sending powers of the UE are P1, P2, and P3 respectively. The UE sends the three historical remaining power usage amounts to the eNB, so that the eNB may determine the first remaining power P=(P1+P2+P3)/3. The preset rule followed by all the base stations is calculating an average of historical remaining power usage amounts in historical scheduling information.

Specifically, when the communication information includes the amount of to-be-transmitted data in the communication between the UE and each base station (the amount of to-be-transmitted data may be an amount of data in a buffer that is of the UE for each base station and used for uplink data transmission), the determining, according to the communication information and the total power headroom of the UE, a first remaining power used for communication with the UE may include:

determining, by the base station according to an amount of data that is sent by the UE from a buffer for the base station, a proportion of the first remaining power used for the communication with the UE in the total power headroom of the UE; and determining, according to the proportion in the total power headroom of the UE, the first remaining power used for the communication with the UE.

A data buffer (buffer) of the UE is used to buffer to-be-sent uplink data. In an existing uplink CA technology, the UE has only one buffer, and data in the buffer is sent by using different base stations. In a multi-link technology, because of a non-ideal backhaul between eNBs, the UE may have a buffer for each base station, and data in each buffer may be sent only by using each corresponding base station. An amount of data in a buffer of the UE for a base station represents a quantity of data that needs to be sent to the base station by the UE. A relatively fully occupied buffer indicates that the UE needs to use a higher power to send data to the base station. Therefore, a power allocated to each base station by the UE may be directly proportional to an amount of data in a buffer corresponding to each base station.

In an exemplary manner, a remaining power that is determined by each base station and used for the communication with the UE is directly proportional to the amount of data in the buffer corresponding to each base station. In an example, there are two base stations, and PH1 and PH2 are a remaining power that is determined by a base station 1 and used for communication with the UE and a remaining power that is determined by a base station 2 and used for communication with the UE respectively. BSc1 and BSc2 are amounts of data in buffers corresponding to the two base stations respectively. If BSc1=BSc2=1000 bytes, PH1/PH2=BSc1/BSc2=1, that is, the remaining power that is determined by the base station 1 and used for the communication with the UE is equal to the remaining power that is determined by the base station 2 and used for the communication with the UE. In this embodiment of the present invention, when the two base stations schedule the UE at the same time, PH1+PH2≤PH is satisfied, where PH is the total power headroom remaining power of the UE.

Specifically, when the communication information includes the path loss power of the communication between the UE and each base station, the determining, according to the communication information and the total power headroom of the UE, a first remaining power used for communication with the UE may include:

determining, according to the path loss power, a proportion of the first power headroom used for the communication with the UE in the total power headroom of the UE; and determining, according to the proportion in the total power headroom of the UE, the first remaining power used for the communication with the UE.

In an exemplary manner, a remaining power that is determined by each base station and used for the communication with the UE is directly proportional to the path loss power of each base station. In an example, there are two base stations, and PH1 and PH2 are a remaining power that is determined by a 1 and used for communication with the UE and a remaining power that is determined by a base station 2 and used for communication with the UE respectively. BH1 and BH2 are a path loss power of communication with the base station 1 and a path loss power of communication with the base station 2 respectively. If BH1=BH2=10 bytes, PH1/PH2=BH1/BH2=1, that is, the remaining power that is determined by the base station 1 and used for the communication with the UE is equal to the remaining power that is determined by the base station 2 and used for the communication with the UE. In this embodiment of the present invention, when the two base stations schedule the UE at the same time, PH1+PH2≤PH is satisfied, where PH is the total power headroom of the UE.

In an embodiment, specifically, the negotiating with the another base station to re-determine a first pre-allocated remaining power and a second pre-allocated remaining power may specifically include:

negotiating with the another base station to re-determine a closed-loop power control adjustment value;

sending a determined closed-loop power control adjustment value to the UE; and receiving a first pre-allocated remaining power and a second pre-allocated remaining power that are recalculated by the UE according to the determined closed-loop power control adjustment value and/or transport format compensation value and a re-determined closed-loop power control adjustment value and/or transport format compensation value sent by the another base station.

An original closed-loop power control adjustment value corresponding to each base station may be sent by the UE, or may be actively obtained by the base station, and all the base stations negotiate to re-determine a closed-loop power control adjustment value according to the original closed-loop power control adjustment value.

Specifically, the UE may calculate PH according to various existing formulas. For example, in carrier aggregation, two types of power headroom PH are defined: Type 1 and Type 2.

In a manner for Type 1:

When the UE sends a PUSCH and does not send a PUCCH on a subframe i in a cell c, $$PH_{type1,c}(i)=P_{CMAX,c}(i)-\{10 \log_{10}(M_{PUSCH,c}(i))+P_{O\_PUSCH,c}(j)+\alpha_c(j)\cdot PL_c+\Delta_{TF,c}(i)+f_c(i)\}[dB] \quad (2),$$

where $P_{CMAX,c}(i)$ is a maximum transmit power configured on the UE when a PUSCH channel is transmitted on a subframe i in a cell c.

When the UE sends a PUSCH and a PUCCH on a subframe i in a cell c, $$PH_{type1,c}(i)=\tilde{P}_{CMAX,c}(i)-\{10 \log_{10}(M_{PUSCHc}(i))+P_{O\_PUSCHc}(j)+\alpha_c(j)\cdot PL_c+\Delta_{TF,c}(i)+f_c(i)\}[dB] \quad (3)$$

where $\tilde{P}_{CMAX,c}(i)$ is a maximum transmit power of the UE when a PUSCH channel is transmitted on a subframe i in a cell c but it is assumed that the UE performs transmission only over a PUCCH.

For meanings of other parameters in the foregoing two formulas, refer to formula (1).

When it is determined that the sum of the second pre-allocated remaining power and the first pre-allocated remaining power is greater than the total power headroom of the UE, the base station negotiates with the another base station to re-determine a closed-loop power control adjustment value for each base station. All the base stations send re-determined closed-loop power control adjustment values to the UE, so that the UE recalculates, by using formula (2) or formula (3), a first pre-allocated remaining power and a second pre-allocated remaining power for all the base stations respectively according to the closed-loop power control adjustment values sent by all the base stations, and sends the calculated first pre-allocated remaining power and second pre-allocated remaining power to each corresponding base station.

Alternatively, when it is determined that the sum of the second pre-allocated remaining power and the first pre-allocated remaining power is greater than the total power headroom of the UE, the base station negotiates with the another base station to re-determine a transport format compensation value $\Delta_{TF,c}(i)$ for each base station. All the base stations send re-determined transport format compensation values $\Delta_{TF,c}(i)$ to the UE, so that the UE re-determines, by using formula (2) or formula (3), a first pre-allocated remaining power and a second pre-allocated remaining power for all the base stations respectively according to the transport format compensation values $\Delta_{TF,c}(i)$ sent by all the base stations.

An original transport format compensation value corresponding to each base station may be sent by the UE, or may be actively obtained by the base station, and all the base stations negotiate to re-determine the transport format compensation value according to the original transport format compensation value.

Alternatively, when it is determined that the sum of the second pre-allocated remaining power and the first pre-allocated remaining power is greater than the total power headroom of the UE, the base station negotiates with the another base station to re-determine a closed-loop power control adjustment value $f_c(i)$ and a transport format compensation value $f_c(i)$ for each base station. All the base stations send re-determined $f_c(i)$ and $\Delta_{TF,c}(i)$ to the UE, so that the UE recalculates, by using formula (2) or formula (3), a first pre-allocated remaining power and a second pre-allocated remaining power for all the base stations respectively according to $f_c(i)$ and $\Delta_{TF,c}(i)$ sent by all the base stations.

An original closed-loop power control adjustment value and an original transport format compensation value that are corresponding to each base station may be sent by the UE, or may be actively obtained by the base station, and all the base stations cooperate to re-determine the closed-loop power control adjustment value and the transport format compensation value according to the original closed-loop power control adjustment value and the original transport format compensation value.

For example, in a double-link system, it is assumed that a pre-allocated remaining power determined by the UE for a macro base station is PH1, and a pre-allocated remaining power determined by the UE for a small cell base station is PH2. If the macro base station and the small cell base station determine that PH1+PH2>PH (the total power headroom of the UE), the macro base station and the small cell base station negotiate to determine $f_c(i)$. For example, a same value is subtracted from $f_c(i)$ of the macro base station and the small cell base station separately, or the macro base station and the small cell base station are proportionally reduced according to a ratio of PH1 to PH2. The macro base station and the small cell base station send re-determined $f_c(i)$ to the UE. The UE recalculates PH1 for the macro base station and recalculates PH2 for the small cell base station by using formula (2) or formula (3), and sends re-determined PH1 and PH2 to the two base stations. The two base stations re-determine whether a sum of received PH1 and PH2 is not greater than the total power headroom of the UE. If the sum of received PH1 and PH2 is greater than the total power headroom of the UE, the two base stations re-determine $f_c(i)$ corresponding to the two base stations, until a sum of PH1 and PH2 is not greater than the total power headroom of the UE.

During calculation, the base stations cooperate $f_c(i)$ and/or $\Delta_{TF,c}(i)$ in the two dynamic offset (offset) values, so that actually used remaining power usage amounts can efficiently coordinate on all independent links. Based on this, the eNB may perform scheduling more efficiently.

Figure 7:
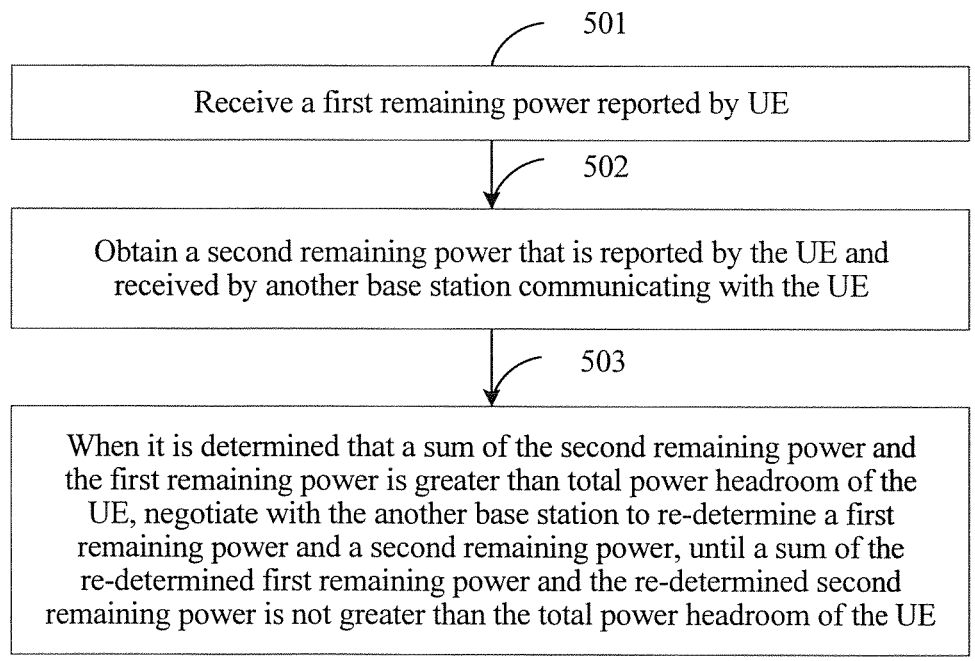
FIG. 7 is a flowchart of a sixth coordinated power allocation method according to an embodiment of the present invention.

An embodiment of the present invention further provides a coordinated power allocation method. As shown in FIG. 7, the method includes the following steps:

Step 501: Receive a first remaining power reported by UE.

Step 502: Obtain a second remaining power that is reported by the UE and received by another base station communicating with the UE.

Step 503: When it is determined that a sum of the second remaining power and the first remaining power is greater than total power headroom of the UE, negotiate with the another base station to re-determine a first remaining power and a second remaining power, until a sum of the re-determined first remaining power and the re-determined second remaining power is not greater than the total power headroom of the UE.

Specifically, the negotiating with the another base station to re-determine a first remaining power and a second remaining power may be implemented in the following manners.

A first implementation manner includes:

negotiating with the another base station to re-determine a closed-loop power control adjustment value for each base station;

sending a determined closed-loop power control adjustment value and/or transport format compensation value to the UE; and receiving a first remaining power and a second remaining power that are recalculated by the UE according to the determined closed-loop power control adjustment value and/or transport format compensation value and a re-determined closed-loop power control adjustment value and/or transport format compensation value sent by the another base station.

When it is determined that the sum of the second remaining power and the first remaining power is greater than the total power headroom of the UE, $f_c(i)$ is re-determined for each base station by negotiating with another base station. All the base stations send re-determined $f_c(i)$ to the UE, so that the UE re-determines, by using formula (2) and formula (3), a first remaining power and a second remaining power for all the base stations respectively according to $f_c(i)$ sent by all the base stations. The first remaining power and the second remaining power that are recalculated by the UE according to determined $\Delta_{TF,c}(i)$ and re-determined $\Delta_{TF,c}(i)$ sent by another base station are received.

Alternatively, when it is determined that the sum of the second remaining power and the first remaining power is greater than the total power headroom of the UE, a transport format compensation value $\Delta_{TF,c}(i)$ is re-determined for each base station by negotiating with another base station. All the base stations send re-determined transport format compensation values $\Delta_{TF,c}(i)$ to the UE, so that the UE re-determines, by using formula (2) and formula (3), a first remaining power and a second remaining power for all the base stations respectively according to $\Delta_{TF,c}(i)$ sent by all the base stations. The first remaining power and the second remaining power that are recalculated by the UE according to determined $\Delta_{TF,c}(i)$ and re-determined $\Delta_{TF,c}(i)$ sent by another base station are received.

Alternatively, when it is determined that the sum of the second remaining power and the first remaining power is greater than the total power headroom of the UE, a closed-loop power control adjustment value $f_c(i)$ and a transport format compensation value $\Delta_{TF,c}(i)$ are re-determined for each base station by cooperating with another base station. All the base stations send re-determined $f_c(i)$ and re-determined $\Delta_{TF,c}(i)$ to the UE, so that the UE re-determines, by using formula (2) and formula (3), a first remaining power and a second remaining power for all the base stations respectively according to $f_c(i)$ and $\Delta_{TF,c}(i)$ sent by all the base stations. The first remaining power and the second remaining power that are recalculated by the UE according to determined $\Delta_{TF,c}(i)$ and re-determined $\Delta_{TF,c}(i)$ sent by another base station are received.

For example, in a double-link system, it is assumed that a first remaining power determined by the UE for a macro base station is PH1, and a second remaining power determined by the UE for a small cell base station is PH2. If the macro base station and the small cell base station determine that PH1+PH2>PH (the total power headroom of the UE), the macro base station cooperates with the small cell base station to determine $f_c(i)$. For example, a same value is subtracted from $f_c(i)$ of the macro base station and the small cell base station separately, or the macro base station and the small cell base station are proportionally reduced according to a ratio of the first remaining power to the second remaining power. The macro base station and the small cell base station send re-determined $f_c(i)$ to the UE. The UE recalculates PH1 for the macro base station and recalculates PH2 for the small cell base station by using formula (2) or formula (3).

During calculation, the base stations cooperate $f_c(i)$ and/or $\Delta_{TF,c}(i)$ in the two dynamic offset (offset) values, so that actually used remaining power usage amounts can efficiently coordinate on all independent links. Based on this, the eNB may perform scheduling more efficiently.

A second implementation manner includes:

re-determining, according to a priority of communication between each base station and the UE, a first remaining power used for communication with the UE.

For example, specifically, a first remaining power allocated to a macro base station is PH1, and a second remaining power allocated to a small cell base station is PH2. If it is determined that a sum of the second remaining power and the first remaining power is greater than the total power headroom of the UE, a first remaining power used for the communication with the UE is re-determined according to preset priorities of communication between the macro base station and the UE and between the small cell base station and the UE. For example, it is preset that the priority of the communication between the macro base station and the UE is higher than that of the communication between the small cell base station and the UE. The macro base station determines that the first remaining power used for the communication with the UE remains unchanged, and a difference between the power headroom and the first remaining power is determined as a second remaining power used for the communication between the small cell base station and the UE.

A third implementation manner includes:

re-determining, according to a scaling factor of communication between each base station and the UE, a first remaining power used for communication with the UE.

The scaling factor may be preset, or may be determined according to determined importance of data transmitted by the UE to each base station or determined communication quality of the communication between the UE and each base station.

For example, a first remaining power allocated to a macro base station is PH1, and a second remaining power allocated to a small cell base station is PH2. If it is determined that a sum of the second remaining power and the first remaining power is greater than the total power headroom of the UE, a first remaining power used for communication with the UE is re-determined according to determined scaling factors of communication between the macro base station and the UE and between the small cell base station and the UE. For example, if the scaling factor re-determined for the macro base station is alpha 1, and the scaling factor determined for the small cell base station is alpha 2, a re-determined first remaining power used for the communication between the macro base station and the UE is PH1×alpha 1, and a re-determined second remaining power used for the communication between the small cell base station and the UE is PH2×alpha 2. Moreover, it can be ensured that alpha 1×PH1+alpha 2×PH2<PH (the total power headroom of the UE).

Alternatively, according to importance of data transmitted by the UE to the macro base station and the small cell base station or communication quality of the communication between the macro base station and the UE and between the small cell base station and the UE (in this embodiment of the present invention, for example, data transmitted by the UE to the macro base station is more important), if a scaling factor used for the communication between the macro base station and the UE is alpha 1, and a re-determined first remaining power is alpha 1×PH1, the macro base station sends the re-determined first remaining power to the small cell base station, and the small cell base station re-determines, according to the received first remaining power sent by the macro base station and the total power headroom of the UE, a second remaining power used for the communication with the UE. The re-determined second remaining power is PH-PH1×alpha 1, where PH is the total power headroom of the UE.

An embodiment of the present invention further provides a coordinated power allocation method, and the method includes:

when it is determined that a sum of uplink powers allocated to all base stations is greater than a maximum transmit power of the UE, determining, according to importance of data transmitted by the UE to each base station or communication quality of communication between the UE and each base station, a scaling factor for scaling down an uplink power allocated to each base station; and scaling down, by using the determined scaling factor for scaling down the uplink power allocated to each base station, the uplink power allocated to each base station, so as to re-obtain an uplink power allocated to each base station and report the re-obtained uplink power allocated to each base station to each corresponding base station; or reporting the remaining power usage amount allocated to each base station and the scaling factor to each corresponding base station.

The uplink power may be a power allocated to each base station by the UE according to communication information, may be a remaining power reported to each base station by the UE in the prior art, or may be an uplink transmit power determined by the UE for each base station, which is not specifically limited in the present invention.

Specifically, the determined remaining power usage amount allocated to each base station and the scaling factor are reported to each corresponding base station by means of a PHR.

In this embodiment of the present invention, a new PHR format is designed and used to include a power scaling (PS, Power Scaling) factor. For example, as shown in FIG. 4, in an existing PHR format, 6 bit are used to represent a PHR, and 1 or 2 bits may be divided to represent a specified scaling factor. As shown in Table 1, a bit representation method and corresponding scaling factors may be pre-defined as a table.

For example, a macro base station is mainly used to transmit control layer data, and important RRC signaling is primarily considered. Therefore, a relatively small scaling factor may be set to ensure reliable data transmission. In addition, for a link in a relatively poor channel condition (a link for communication between the UE and a small cell base station), the scaling factor may be reduced.

Although the scaling factor occupies an extra PHR report bit, considering a reduced data amount and improved data reliability in a double-link system in which data is split and different data is transmitted on different links, required PHR representation bits may be correspondingly reduced.

In the method provided in this embodiment of the present invention, it can be ensured that uplink powers allocated to all base stations do not exceed a maximum transmit power of UE, which optimizes scheduling. Moreover, the allocated uplink power is proportionally reduced according to a communication status between the UE and each base station, which is more conducive to matching a status of each communication link when the base station performs the scheduling.

Figure 8:
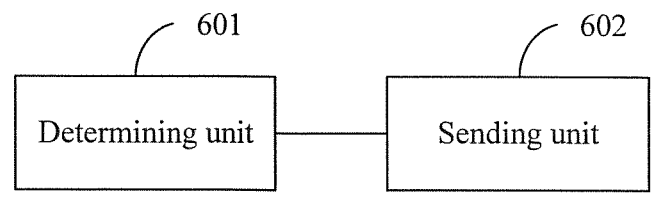
FIG. 8 is a schematic diagram of a first coordinated power allocation apparatus according to an embodiment of the present invention.

An embodiment of the present invention provides a coordinated power allocation apparatus, and the apparatus may be deployed at a user equipment side. As shown in FIG. 8, the apparatus includes:

a determining unit 601, configured to determine communication information about communication between user equipment UE and each base station, and determine, according to the communication information, remaining power usage information allocated to each base station; and a sending unit 602, configured to report the remaining power usage information that is allocated to each base station and determined by the determining unit 601 to each corresponding base station.

How the UE notifies the base station of remaining power usage information allocated to the base station is not limited in this embodiment of the present invention. The UE may notify, by using various existing manners or approaches for communication with a base station, the base station of the remaining power usage information allocated to the base station.

In this embodiment of the present invention, at a UE side, a power of UE is actively allocated to each base station according to communication information about communication between the UE and each base station, that is, the UE actively determines, according to some communication information, a remaining power that should be allocated to each base station, and reports usage information about the allocated remaining power to each corresponding base station. Therefore, a problem of uplink power coordination of the UE between base stations is resolved at the UE side, and an allocated power is more accurate, which avoids a waste of resources.

Specifically, the communication information that is determined by the determining unit and about the communication between the user equipment UE and each base station includes at least one of the following:

an amount of to-be-transmitted data in the communication between the UE and each base station;

historical scheduling information of the communication between the UE and each base station; or a path loss power of the communication between the UE and each base station.

The determining unit may determine a remaining power usage amount allocated to each base station or a remaining power usage proportion allocated to each base station as the remaining power usage information allocated to each base station.

The sending unit 602 is further configured to: if the remaining power usage information that is allocated to each base station and determined by the determining unit 601 is the remaining power usage proportion allocated to each base station, after the remaining power usage information allocated to each base station is determined, report total power headroom of the UE to each corresponding base station.

In an embodiment, the apparatus further includes a processing unit.

The determining unit 601 is further configured to: when the remaining power usage information that is allocated to each base station and determined according to the communication information is the remaining power usage amount allocated to each base station, and when it is determined that a sum of the remaining power usage amounts allocated to all the base stations is greater than the total power headroom of the UE, before the determined remaining power usage amount allocated to each base station is reported to each corresponding base station, determine, according to importance of data transmitted by the UE to each base station or communication quality of the communication between the UE and each base station, a scaling factor for scaling down the remaining power usage amount allocated to each base station.

The processing unit is configured to scale down, by using the scaling factor that is determined by the determining unit and for scaling down the remaining power usage amount allocated to each base station, the remaining power usage amount allocated to each base station, so as to re-obtain a remaining power usage amount allocated to each base station. The sending unit is configured to report the re-obtained remaining power usage amount allocated to each base station to each corresponding base station.

In an embodiment, the determining unit 601 is further configured to: when the remaining power usage information that is allocated to each base station and determined according to the communication information is the remaining power usage amount allocated to each base station, and when it is determined that a sum of the remaining power usage amounts allocated to all the base stations is greater than the total power headroom of the UE, before the determined remaining power usage amount allocated to each base station is reported to each corresponding base station, determine, according to importance of data transmitted by the UE to each base station or communication quality of the communication between the UE and each base station, a scaling factor for scaling down the remaining power usage amount allocated to each base station.

The sending unit 602 is configured to report the remaining power usage amount that is allocated to each base station and determined by the determining unit 601 and the scaling factor to each corresponding base station.

Specifically, the sending unit 602 reports, by means of a PHR, the determined remaining power usage amount allocated to each base station and the scaling factor to each corresponding base station.

In an embodiment, the determining unit 601 is configured to:

determine, according to the communication information, the remaining power usage proportion allocated to each base station; and determine, according to the remaining power usage proportion and the total power headroom of the UE, the remaining power usage amount allocated to each base station.

Specifically, when the communication information includes the historical scheduling information of the communication between the UE and each base station, step 103*a* of the determining, according to the communication information, a remaining power usage amount allocated to each base station may include:

obtaining, according to the historical scheduling information, a historical remaining power generated when the UE is scheduled by each base station; and determining, according to the historical remaining power, the remaining power usage amount allocated to each base station.

Specifically, when the communication information includes the amount of to-be-transmitted data in the communication between the UE and each base station (the amount of to-be-transmitted data may be an amount of data in a buffer that is of the UE for each base station and used for uplink data transmission), the determining, by the determining unit 601 according to the communication information, a remaining power usage proportion allocated to each base station may be specifically:

determining, according to the amount of data in the buffer, the remaining power usage proportion allocated to each base station, that is, a proportion of a remaining power usage amount allocated to each base station in the total power headroom of the UE.

The remaining power usage amount allocated to each base station may be further determined according to the proportion in the total power headroom of the UE.

Specifically, when the communication information includes the path loss power of the communication between the UE and each base station, the determining, according to the communication information, the remaining power usage proportion allocated to each base station may include:

obtaining, according to the path loss power, the remaining power usage proportion allocated to each base station, that is, a proportion of a remaining power usage amount allocated to each base station in the total power headroom of the UE.

The remaining power usage amount allocated to each base station may be further determined according to the proportion in the total power headroom of the UE.

Figure 9:
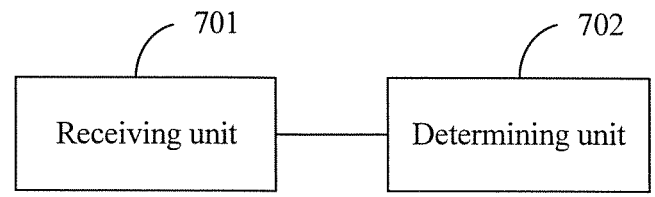
FIG. 9 is a schematic diagram of a second coordinated power allocation apparatus according to an embodiment of the present invention.

An embodiment of the present invention provides a coordinated power allocation apparatus, and the apparatus may be deployed at a base station side. As shown in FIG. 9, the apparatus includes:

a receiving unit 701, configured to receive total power headroom of UE and communication information that is sent by the UE and about communication between the UE and each base station; and a determining unit 702, configured to determine, according to the communication information and the total power headroom of the UE that are received by the receiving unit 701, a first remaining power used for communication with the UE.

After receiving the communication information and the remaining power of the UE, each base station determines, according to a same preset rule, the first remaining power used for the communication with the UE.

The preset rule may be defined as a function in which the foregoing reported information is used as a parameter. If definition of the function is consistent and known by the base stations, the function is referred to as a preset rule. The total power headroom of the UE multiplying a value calculated by using the function is the remaining power used for the communication between the base station and the UE. For example, in a double-link system, the function may be represented as Func(A1, B1, C1)/Func(A2, B2, C2)), where A1, B1, and C1 are information factors sent by the foregoing UE to a base station 1, and A2, B2, and C2 are information factors sent by the foregoing UE to a base station2.

In an embodiment, the determining unit 702 is specifically configured to:

determine, according to the communication information, a first pre-allocated remaining power used for the communication with the UE;

obtain a second pre-allocated remaining power used for communication between the UE and another base station communicating with the UE;

if it is determined that a sum of the second pre-allocated remaining power and the first pre-allocated remaining power is greater than the total power headroom of the UE, negotiate with the another base station to re-determine a first pre-allocated remaining power and a second pre-allocated remaining power, until a sum of the re-determined first pre-allocated remaining power and the re-determined second pre-allocated remaining power is not greater than the total power headroom of the UE; and determine the re-determined first pre-allocated remaining power as the first remaining power used for the communication with the UE.

Specifically, when the communication information includes the historical scheduling information of the communication between the UE and each base station, the determining, by the determining unit 702 according to the communication information, a first pre-allocated remaining power used for the communication with the UE may be specifically implemented in the following manner:

determining, by the determining unit 702 of the base station according to the historical scheduling information, a historical remaining power usage amount generated when the UE is scheduled by the base station; and determining, according to the historical remaining power usage amount, the first pre-allocated remaining power used for the communication with the UE.

Specifically, when the communication information includes the amount of to-be-transmitted data in the communication between the UE and each base station (the amount of to-be-transmitted data may be an amount of data in a buffer that is of the UE for each base station and used for uplink data transmission), the determining, by the determining unit 702 of the base station according to the communication information and the total power headroom of the UE, a first remaining power used for communication with the UE may be specifically implemented in the following manner:

determining, by the determining unit 702 of the base station according to an amount of data that is sent by the UE from a buffer for the base station, a proportion of the first remaining power used for the communication with the UE in the total power headroom of the UE; and determining, according to the proportion in the total power headroom of the UE, the first remaining power used for the communication with the UE.

Specifically, when the communication information includes the path loss power of the communication between the UE and each base station, the determining, by the determining unit 702 according to the communication information and the total power headroom of the UE, a first remaining power used for communication with the UE may be specifically implemented in the following manner:

determining, according to the path loss power, a proportion of the first remaining power used for the communication with the UE in the total power headroom of the UE; and determining, according to the proportion in the total power headroom of the UE, the first remaining power used for the communication with the UE.

Specifically, the determining unit 702 is specifically configured to negotiate with the another base station to re-determine a closed-loop power control adjustment value and/or transport format compensation value, and send a determined closed-loop power control adjustment value and/or transport format compensation value to the UE.

The receiving unit 701 is further configured to receive a first pre-allocated remaining power and a second pre-allocated remaining power that are recalculated by the UE according to the determined closed-loop power control adjustment value and/or transport format compensation value and a re-determined closed-loop power control adjustment value and/or transport format compensation value sent by the another base station.

In an embodiment, the determining unit 702 is configured to:

determine, according to the communication information, a first pre-allocated remaining power used for the communication with the UE;

obtain a second pre-allocated remaining power used for communication between the UE and another base station communicating with the UE;

if it is determined that a sum of the second pre-allocated remaining power and the first pre-allocated remaining power is greater than the total power headroom of the UE, re-determine, according to a priority of the communication between each base station and the UE, a first pre-allocated remaining power and a second pre-allocated remaining power that are used for the communication with the UE; and determine the re-determined first pre-allocated remaining power as the first remaining power used for the communication with the UE.

For example, in a double-link system, a macro base station determines, according to the communication information, a first pre-allocated remaining power used for communication with the UE, and obtains a second pre-allocated remaining power used for communication between the UE and a small cell base station communicating with the UE. If it is determined that a sum of the second pre-allocated remaining power and the first pre-allocated remaining power is greater than the total power headroom of the UE, the macro base station re-determines, according to preset priorities of the communication between the macro base station and the UE and between the small cell base station and the UE, a first pre-allocated remaining power used for the communication with the UE. For example, it is preset that the priority of the communication between the macro base station and the UE is higher than that of the communication between the small cell base station and the UE. The macro base station determines that the first remaining power used for the communication with the UE remains unchanged. A difference between the total power headroom of the UE and the first pre-allocated remaining power is determined as a second pre-allocated remaining power used for the communication between the small cell base station and the UE, and the re-determined first pre-allocated remaining power is determined as the first remaining power used for the communication with the UE.

Figure 10:
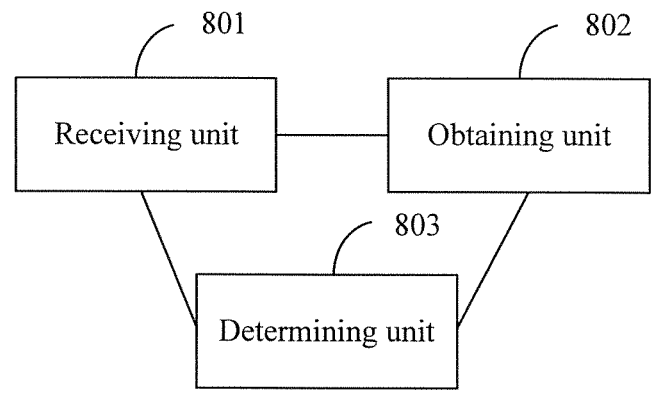
FIG. 10 is a schematic diagram of a third coordinated power allocation apparatus according to an embodiment of the present invention.

An embodiment of the present invention further provides a coordinated power allocation apparatus. As shown in FIG. 10, the apparatus includes:

a receiving unit 801, configured to receive a first remaining power reported by user equipment UE;

an obtaining unit 802, configured to obtain a second remaining power that is reported by the UE and received by another base station communicating with the UE; and a determining unit 803, configured to: when it is determined that a sum of the second remaining power and the first remaining power is greater than total power headroom of the UE, negotiate with the another base station to re-determine a first remaining power and a second remaining power, until a sum of the re-determined first remaining power and the re-determined second remaining power is not greater than the total power headroom of the UE.

In an embodiment, the apparatus further includes a sending unit.

The determining unit 803 is configured to negotiate with the another base station to re-determine a closed-loop power control adjustment value and/or transport format compensation value.

The sending unit is configured to send a determined closed-loop power control adjustment value and/or transport format compensation value to the UE.

The receiving unit 801 is further configured to receive a first remaining power and a second remaining power that are recalculated by the UE according to the determined closed-loop power control adjustment value and/or transport format compensation value and a re-determined closed-loop power control adjustment value and/or transport format compensation value sent by the another base station.

In an embodiment, the determining unit 803 is configured to:

re-determine, according to a priority of the communication between each base station and the UE, a first remaining power and a second remaining power that are used for the communication with the UE.

An embodiment of the present invention further provides a coordinated power allocation apparatus, and the apparatus may be deployed at a user equipment side. The apparatus includes:

a processing unit, configured to: when it is determined that a sum of uplink powers allocated to all base stations is greater than a maximum transmit power of the UE, determine, according to importance of data transmitted by the UE to each base station or communication quality of communication between the UE and each base station, a scaling factor for scaling down an uplink power allocated to each base station, and scale down, by using the determined scaling factor for scaling down the uplink power allocated to each base station, the uplink power allocated to each base station, so as to re-obtain an uplink power allocated to each base station; and a sending unit, configured to report the re-obtained uplink power allocated to each base station to each corresponding base station, or report the uplink power allocated to each base station and the scaling factor to each corresponding base station.

The uplink power may be a power allocated to each base station by the UE according to communication information, may be a remaining power reported to each base station by the UE in the prior art, or may be an uplink transmit power determined by the UE for each base station, which is not specifically limited in the present invention.

In the apparatus provided in this embodiment of the present invention, it can be ensured that uplink powers allocated to all base stations do not exceed a maximum transmit power of UE, which optimizes scheduling. Moreover, the allocated uplink power is proportionally reduced according to a communication status between the UE and each base station, which is more conducive to matching a status of each communication link when the base station performs the scheduling.

An embodiment of the present invention provides user equipment, including:

a processor, configured to determine communication information about communication between the user equipment UE and each base station, and determine, according to the communication information, remaining power usage information allocated to each base station; and a transceiver, configured to report the remaining power usage information that is allocated to each base station and determined by the determining unit 601 to each corresponding base station.

Specifically, the communication information that is determined by the processor and about the communication between the user equipment UE and each base station includes at least one of the following:

an amount of to-be-transmitted data in the communication between the UE and each base station;

historical scheduling information of the communication between the UE and each base station; or a path loss power of the communication between the UE and each base station.

The processor may determine a remaining power usage amount allocated to each base station or a remaining power usage proportion allocated to each base station as the remaining power usage information allocated to each base station.

If the remaining power usage information that is allocated to each base station and determined by the processor is the remaining power usage proportion allocated to each base station, after the remaining power usage information allocated to each base station is determined, the transceiver reports total power headroom of the UE to each corresponding base station.

In an embodiment, when the processor determines, according to the communication information, that the remaining power usage information allocated to each base station is the remaining power usage amount allocated to each base station, and when the processor determines that a sum of the remaining power usage amounts allocated to all the base stations is greater than the total power headroom of the UE, before the transceiver reports the determined remaining power usage amount allocated to each base station to each corresponding base station, the processor determines, according to importance of data transmitted by the UE to each base station or communication quality of the communication between the UE and each base station, a scaling factor for scaling down the remaining power usage amount allocated to each base station, and scales down, by using the scaling factor that is determined by the determining unit and for scaling down the remaining power usage amount allocated to each base station, the remaining power usage amount allocated to each base station, so as to re-obtain a remaining power usage amount allocated to each base station. The transceiver is configured to report the remaining power usage amount that is allocated to each base station and re-obtained by the processor to each corresponding base station.

In an embodiment, when determining, according to the communication information, that the remaining power usage information allocated to each base station is the remaining power usage amount allocated to each base station, and when determining that a sum of the remaining power usage amounts allocated to all the base stations is greater than the total power headroom of the UE, before the determined remaining power usage amount allocated to each base station is reported to each corresponding base station, the processor determines, according to importance of data transmitted by the UE to each base station or communication quality of the communication between the UE and each base station, a scaling factor for scaling down the remaining power usage amount allocated to each base station. The transceiver reports the remaining power usage amount that is allocated to each base station and determined by the determining unit 601 and the scaling factor to each corresponding base station.

In an embodiment, the processor determines, according to the communication information, the remaining power usage proportion allocated to each base station, and determines, according to the remaining power usage proportion and the total power headroom of the UE, the remaining power usage amount allocated to each base station.

An embodiment of the present invention further provides a base station, including:

a transceiver, configured to receive total power headroom of UE and communication information that is sent by the UE and about communication between the UE and each base station; and a processor, configured to determine, according to the communication information and the total power headroom of the UE that are received by the transceiver, a first remaining power used for communication with the UE.

In an embodiment, the processor determines, according to the communication information, a first pre-allocated remaining power used for the communication with the UE; obtains a second pre-allocated remaining power used for communication between the UE and another base station communicating with the UE; if it is determined that a sum of the second pre-allocated remaining power and the first pre-allocated remaining power is greater than the total power headroom of the UE, negotiates with the another base station to re-determine a first pre-allocated remaining power and a second pre-allocated remaining power, until a sum of the re-determined first pre-allocated remaining power and the re-determined second pre-allocated remaining power is not greater than the total power headroom of the UE; and determines the re-determined first pre-allocated remaining power as the first remaining power used for the communication with the UE.

Specifically, the processor negotiates with the another base station to re-determine a closed-loop power control adjustment value and/or transport format compensation value. A determined closed-loop power control adjustment value and/or transport format compensation value is sent to the UE. The transceiver receives a first pre-allocated remaining power and a second pre-allocated remaining power that are recalculated by the UE according to the determined closed-loop power control adjustment value and/or transport format compensation value and a re-determined closed-loop power control adjustment value and/or transport format compensation value sent by the another base station.

In an embodiment, the processor determines, according to the communication information, a first pre-allocated remaining power used for the communication with the UE; obtains a second pre-allocated remaining power used for communication between the UE and another base station communicating with the UE; if it is determined that a sum of the second pre-allocated remaining power and the first pre-allocated remaining power is greater than the total power headroom of the UE, re-determines, according to a priority of the communication between each base station and the UE, a first pre-allocated remaining power and a second pre-allocated remaining power that are used for the communication with the UE; and determines the re-determined first pre-allocated remaining power as the first remaining power used for the communication with the UE.

An embodiment of the present invention further provides a base station, including:

a receiver, configured to receive a first remaining power reported by user equipment UE;

a processor, configured to obtain a second remaining power that is reported by the UE and received by another base station communicating with the UE, and when it is determined that a sum of the second remaining power and the first remaining power is greater than total power headroom of the UE, negotiate with the another base station to re-determine a first remaining power and a second remaining power, until a sum of the re-determined first remaining power and the re-determined second remaining power is not greater than the total power headroom of the UE.

In an embodiment, the processor negotiates with the another base station to re-determine a closed-loop power control adjustment value and/or transport format compensation value. The transceiver is configured to send a determined closed-loop power control adjustment value and/or transport format compensation value to the UE, and receive a first remaining power and a second remaining power that are recalculated by the UE according to the determined closed-loop power control adjustment value and/or transport format compensation value and a re-determined closed-loop power control adjustment value and/or transport format compensation value sent by the another base station.

In an embodiment, the processor re-determines, according to a priority of the communication between each base station and the UE, a first remaining power and a second remaining power that are used for the communication with the UE.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present is intended to cover these modifications and variations provided that they fall within the scope of protection defined by the following claims and their equivalent technologies.

What is claimed is:

1. A coordinated power allocation method, comprising:
   determining communication information about communication between user equipment (UE) and a plurality of base stations, wherein the determined communication information comprises an amount of to-be-transmitted data in the communication between the UE and each base station or historical scheduling information of the communication between the UE and each base station;
   determining, according to the communication information and based at least in part on the amount of to-be-transmitted data in the communication between the UE and each base station or the historical scheduling information of the communication between the UE and each base station, a remaining power usage amount allocated to each of the plurality of base stations; and
   scaling down, by using a determined scaling factor, the remaining power usage amount allocated to each base station, so as to re-obtain a remaining power usage amount allocated to each base station and report to each corresponding base station.

2. The method according to claim 1, wherein determining, according to the communication information, a remaining power usage amount allocated to each of the plurality of base stations comprises:
   determining, according to the communication information, the remaining power usage proportion allocated to each base station; and
   determining, according to the remaining power usage proportion and the total power headroom of the UE, the remaining power usage amount allocated to each base station.

3. The method according to claim 1, wherein the determined communication information about the communication between the user equipment (UE) and each base station also comprises:
   a path loss power of the communication between the UE and each base station.

4. A coordinated power allocation method, comprising:
   when a sum of uplink powers allocated to a plurality of base stations is greater than a maximum transmit power of a UE, determining, according to communication quality of communication between the UE and each base station, a scaling factor for scaling down an uplink power allocated to each base station; and
   scaling down, by using the determined scaling factor, the uplink power allocated to each base station, so as to re-obtain an uplink power allocated to each base station and report to each base station to each corresponding base station, or reporting the remaining power usage amount allocated to each base station and the scaling factor to each corresponding base station.

5. A device, comprising:
   a processor configured to:
      determine communication information about communication between user equipment (UE) and a plurality of base stations, wherein the communication information about the communication between the user equipment (UE) and each base station comprises an amount of to-be-transmitted data in the communication between the UE and each base station or historical scheduling information of the communication between the UE and each base station,
      determine, according to the communication information and based at least in part on the amount of to-be-transmitted data in the communication between the UE and each base station or the historical scheduling information of the communication between the UE and each base station, a remaining power usage amount allocated to each of the plurality of base stations, and
      scaling down, by using a determined scaling factor, the remaining power usage amount allocated to each base station, so as to re-obtain a remaining power usage amount allocated to each base station; and
   a transmitter configured to send the remaining power usage amount that is allocated to each base station and re-obtained by the processor to each corresponding base station.

6. The device according to claim 5, wherein the processor is further configured to:
   determine, according to the communication information, the remaining power usage proportion allocated to each base station; and
   determine, according to the remaining power usage proportion and the total power headroom of the UE, the remaining power usage amount allocated to each base station.

7. The device according to claim 5, wherein the communication information that is determined by the processor and about the communication between the device and each of the plurality of base stations also comprises:
   a path loss power of the communication between the UE and each base station.

* * * * *